United States Patent Office 3,706,653
Patented Dec. 19, 1972

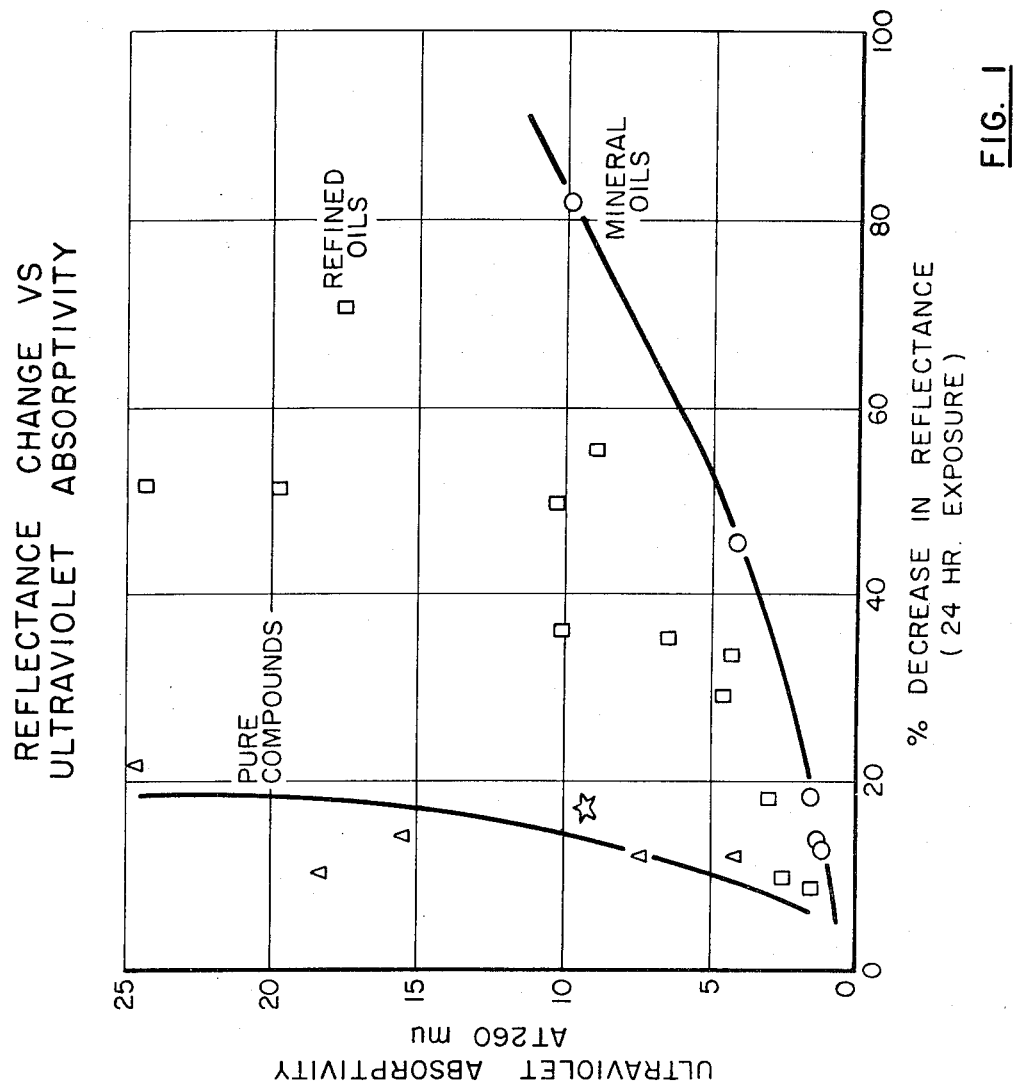

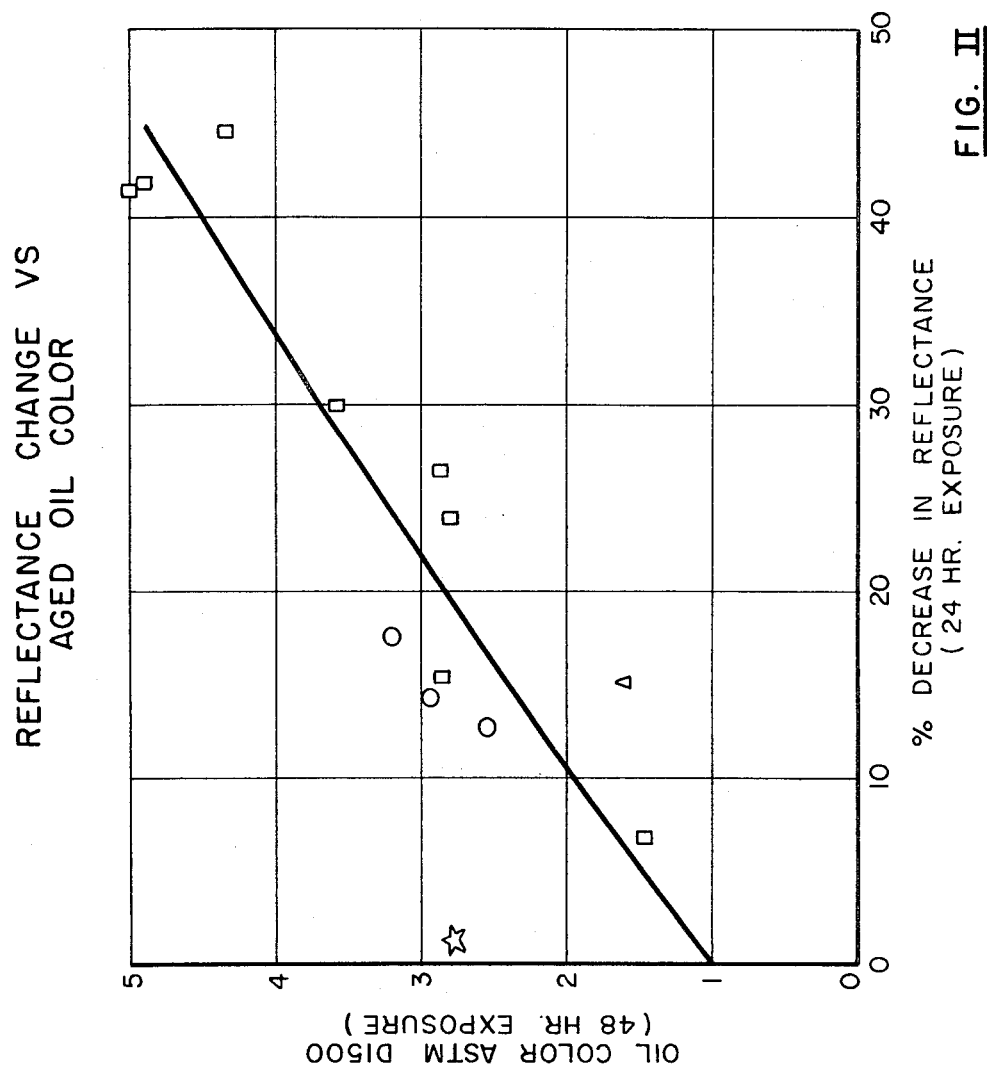

3,706,653
LIGHT-COLORED HIGHLY AROMATIC OIL AND PROCESS OF PREPARATION
Ivor W. Mills, Media, Glenn R. Dimeler, West Chester, and Merritt C. Kirk, Jr., Thornton, Pa., assignors to Sun Oil Company, Philadelphia, Pa.
Continuation-in-part of application Ser. No. 636,493, May 5, 1967. This application Oct. 27, 1969, Ser. No. 874,087
Int. Cl. C10g 39/00
U.S. Cl. 208—64
12 Claims

ABSTRACT OF THE DISCLOSURE

A novel light-stable rubber process oil containing 45–85 percent of aromatic hydrocarbons is obtained in high yield from a 40–10,000 SUS (at 100° F.) naphthenic distillate by a two-step aromatization process. In the first step, with a sulfactive catalyst, the sulfur and nitrogen in the oil are greatly reduced and the aromatic content increases. In the second step, with Ni or noble metal catalyst, the aromatic content is further increased and the product oil has good color stability when aged in the presence of ultraviolet light. Oils produced by the process are especially useful when compounded with natural rubbers and synthetic elastomeric polymers (e.g., neoprene, GRS) which exhibit improved processability and physical properties when compounded with oils of high aromaticity.

CROSS REFERENCES TO RELATED APPLICATIONS

| Ser. No. | Filing date | Title |
|---|---|---|
| 622,398 [1] | 3–13–67 | "Clay Treatment of Hydrorefined Oils"—Ivor W. Mills, Glenn R. Dimeler. |
| 636,493 [2] | 5–5–67 | "Process for Preparing an Aromatic oil and Non-Discoloring Rubber Composition, Containing Said Oil"—Ivor W. Mills, Glenn R. Dimeler, Merritt C. Kirk, Jr. |
| 652,026 | 7–10–67 | "Process for Producing Cable Oils by Sequential Refining Steps"—Ivor W. Mills, Glenn R. Dimeler. |
| 730,999 | 5–22–68 | "Hydrorefined Transformer Oil and Process of Manufacture"—Ivor W. Mills, Glenn R. Dimeler. |
| 792,131 | 1–17–69 | "High Modulus Composition Comprising Hydrocarbon Oil, Rubber and Carbon Black"—Ivor W. Mills, Glenn R. Dimeler, Merritt C. Kirk, Jr., Jackson S. Boyer. |
| 812,516 | 2–19–69 | "Catalytic Hydrofinishing of Petroleum Distillates in the Lubricating Oil Boiling Range"—Ivor W. Mills, Glenn R. Dimeler, Merritt C. Kirk, Jr., Albert T. Olenzak. |
| 850,779 | 8–18–69 | "Electrical Conduit Containing Hydrorefined Oil"—Ivor W. Mills, Glenn R. Dimeler, John J. Melchiore. |
| 850,778 | 8–18–69 | "Process for Preparing High Viscosity Hydrorefined Cable Oil"—Ivor W. Mills, Glenn R. Dimeler, William A. Atkinson, Jr., James P. Hoffman. |
| 850,716 [3] | 8–18–69 | "Blended Hydrocarbon Oil and Process of Manufacture"—Ivor W. Mills, Glenn R. Dimeler. |
| 850,717 | 8–18–69 | "Hydrorefined Lube Oil and Process of Manufacture"—Ivor W. Mills, Glenn R. Dimeler. |

[1] Now U.S. Pat. No. 3,462,358, issued Aug. 19, 1969.
[2] The present application is a continuation-in-part of Ser. No. 636,493
[3] Now abandoned.

The disclosure of all of the above-referred to applications (all of which are assigned to the Sun Oil Company) is hereby incorporated herein by reference, particularly as to disclosure therein directed to hydrorefined oils in the lube viscosity range, to uses of such oils, to the production of such oils and to the production of rubber containing oil as a plasticizer or extender.

SUMMARY OF THE INVENTION

This invention relates to a two-stage aromatization process for preparing non-discoloring rubber process oils from petroleum stocks boiling mainly above 580° F. and to non-discoloring rubber compositions containing such oils.

We have found that an aromatic hydrocarbon fluid, useful as a non-discoloring rubber processing oil, can be prepared by a two-step hydro-aromatization process wherein the feed is a naphthenic distillate boiling mainly above 580° F., having a viscosity in the range of 40–10,000 SUS at 100° F. and containing non-hydrocarbon impurities comprising organic heterocyclic sulfur and nitrogen compounds and containing more than 30 percent aromatic hydrocarbons.

In the first step the naphthenic distillate feed is contacted with a solid sulfided nickel-molybdenum hydrogenation catalyst, in the presence of hydrogen, and at a temperature, space velocity and pressure such that the resulting refined product contains less than 100 p.p.m. of sulfur and a greater percentage by weight of aromatic hydrocarbons than is contained in the original naphthenic distillate feed. In order to increase the aromaticity of the feed and also minimize hydrocracking, the temperature in this step must be below 775° F., the pressure must be maintained below 1500 p.s.i.g., and the liquid hourly space velocity (LHSV) must be in the range of 0.25 to 2.5 volumes of feed per volume of catalyst per hour.

In our second aromatization step, at least a major portion of the product of the first aromatization step is contacted with a solid hydrogenation-dehydrogenation catalyst comprising at least one metal selected from the group consisting of nickel, platinum, palladium and rhodium. The contacting is at a temperature below 775° F. and at a space rate and pressure such that the product of the contacting contains less than 10 p.p.m. of sulfur and nitrogen and a greater percentage by weight of aromatic compounds than did the portion of the product of the first step which is utilized as a feed in this second step. When the product of this second step is topped, as by vacuum distillation, to the same initial flash point as the portion of the product of the first step which is used as a feed in the second step, the resulting step (b) oil will have the greater color stability when aged in the presence of ultraviolet light.

Our invention also includes novel hydrocarbon oils, useful for rubber processing, which have a viscosity-gravity constant above 0.83, a viscosity at 100° F. of 40–10,000 SUS, which boil mainly above 550° F., and contain 45–85 percent of aromatic hydrocarbons. These novel oils are particularly useful as non-discoloring rubber process oils in that they have an initial ASTM D1500 color lighter than 1.5 and an ASTM D1500 color less than 3.0 when they are aged for 48 hours in the presence of ultraviolet light under "Test Procedure A" which is described hereinafter.

An especially desirable class of such oils are those oils containing more than 50 percent of aromatic hydrocarbon and boiling mainly above 580° F. which have a 260 UVA greater than 8.0, since these oils possess unusual color stability in view of their high content of polycyclic aromatic compounds. Such oils are particularly useful in articles containing vinyl, neoprene, or SBR rubber.

Our invention also includes a novel light-colored rubber vulcanizate having good color stability when exposed to ultraviolet light and which contains as a plasticizer or extender from 5–60 percent by weight of a refined petroleum oil having a viscosity at 100° F. of from 40–10,000 SUS and contains from 45–85 percent of aromatic hydrocarbons and less than 10 p.p.m. of sulfur and nitrogen and has a 260 UVA greater than 6.0. Such a rubber vulcanizate can be prepared from oils produced by our process.

A particularly useful, novel, rubber composition, having improved tensile properties, comprises about 100 parts of GRS rubber and about 20 parts of 45–85 percent aromatic oil produced by our process and containing the usual materials of a whitewall rubber tire formulation.

Another novel rubber composition comprises 100 parts of a neoprene rubber and 40–60 parts of a non-discoloring 50–85 percent aromatic oil prepared by our process and which has a 260 UVA greater than 8.0 and with the usual other materials used in compounding a sponge formulation. Sponges prepared from such compositions can contain a greater amount of oil than can similar sponges prepared from neoprene and prior art naphthenic oils, since our highly aromatic oils are more compatible with neoprene than the heretofore available naphthenic oils containing from 25–40 percent aromatics and refined by conventional procedures.

We have further discovered that the initial color and the color which our oils attain upon aging in the presence of ultra violet light can be reduced by contacting the product of the first step of our process with an adsorbent comprising an acid-activated clay, a naturally-occurring fuller's earth bleaching clay, charcoal, bauxite or mixtures thereof prior to the contacting of our second aromatization step. Such an adsorbent contact also reduces the sulfur and nitrogen in the feed to our second aromatization step and thus increases the life of the catalyst.

Other aspects of our invention relate to specific processing conditions which are necessary or, at least, highly desirable when processing the more highly viscous naphthenic distillates, or for maintaining catalyst life or to obtain high yields of the more highly aromatic oils and yet maintain the non-discoloring property of the oil when it is aged in the presence of ultraviolet light. A particularly useful embodiment of our process comprises effecting the contacting of the first step at a pressure below 600 p.s.i.g. and at a temperature and space velocity such that there is a net production of hydrogen and then contacting a major portion of the product of step (a) at a pressure at least 20 percent lower than the pressure in step (a) in the presence of hydrogen and at a temperature and space velocity such that methane is produced.

BACKGROUND OF THE INVENTION

Petroleum oils are widely used as plasticizers or extenders for natural or synthetic rubber compositions. Plasticized rubber compositions should exhibit good color stability when aged in the presence of ultraviolet light, since this property correlates with the stability of the color of a rubber article during normal use, out of doors, in sunlight. Non-staining properties of such compositions are also important, in order that metal and other surfaces adjacent to the rubber composition are not stained by contact therewith.

Another requirement of a satisfactory rubber process oil is sufficient processability with the rubber to permit satisfactory compounding and incorporation of enough oil into the composition to obtain the desired properties. Generally, the processability of a petroleum plasticizer increases with increasing aromatic hydrocarbon content of the plasticizer.

Petroleum oils containing large amounts of aromatic hydrocarbon, e.g., solvent extracts of naphthenic distillates, are usually satisfactory from the standpoint of processability; however, such oils are often unsatisfactory with regard to staining characteristics, and at aromatic contents higher than about 35 percent, such oils are unsatisfactory for use in light colored rubber compositions since they cause the rubber composition to discolor on aging in the presence of sunlight.

All of the presently available refining processes which can be used to improve the non-discoloring property of the highly aromatic petroleum oils derived from naphthenic crudes will decrease the aromatic content of the oil. Furthermore, the art knows of no process which can be used to increase the aromaticity and thus, the processability, of a naphthenic oil which will not also increase the tendency of the oil to discolor rubber upon exposure to ultraviolet light.

Although catalytic aromatization of naphthenic hydrocarbons in the presence of hydrogen is well known to the art, such processes have been used to increase the aromaticity of the lower boiling petroleum fractions, such as naphtha, and have not heretofore been used to increase the aromaticity of a 40–10,000 SUS naphthenic distillate.

The art has not heretofore possessed a non-discoloring naphthenic rubber process oil containing more than 45 percent of aromatic compounds.

If a rubber processing oil is to be used in white or light colored rubber articles, the oil must be "non-discoloring," that is, the color of the oil containing rubber article must not darken excessively when the article is exposed, during normal use, to sunlight. In many rubber formulations, oils of high aromatic content are desirable; however, those naphthenic oils having high aromaticity which have been heretofore available to the art have not had sufficient color stability, when aged in sunlight (or ultraviolet light) to be satisfactory in white or light colored rubber compounds.

If naphthenic distillates boiling mainly above 580° F. and containing from 35 to 50 percent of aromatic compounds are to be used in white or light colored rubber compositions, the usual refining processes which are used to prevent these highly aromatic oils from darkening on exposure to ultraviolet light (UV), such as furfural extraction and/or contacting with $H_2SO_4$, will decrease the aromatic content of the distillate oil. The more highly aromatic the distillate, the greater the degree of removal of aromatics which is necessary by such conventional processing if the color of a rubber composition containing the oil is to be stable when the composition is aged in the presence of ultraviolet light.

Mild hydrogenation or hydrotreatment, such as hydrodesulfurization, can be used to improve the initial color of an oil but such processing does not produce satisfactory non-discoloring rubber process oils from the more viscous (100–10,000 SUS at 100° F.) naphthenic distillates which contain from 40–50% of aromatic hydrocarbons. The poor UV stability of such hydrotreated oils is probably due to the polar heterocyclic sulfur and nitrogen containing compounds which are found in such hydrotreated oils. We have discovered that satisfactory UV stability is not found in such highly aromatic oils unless the nitrogen and sulfur in the oil are reduced to a level such that the oil contains less than 2 percent (preferably less than 1 percent) of polar compounds as measured by the ASTM D2007–62T clay-gel analysis. In addition, the weight ratio of polar compounds to aromatic compounds in any rubber process oil must be less than 0.05 if rubber containing the oil is to have satisfactory color stability on exposure to sunlight.

By mild hydrogenation or hydrotreatment we refer to those catalytic processes conducted below 800 p.s.i. of hydrogen or below 500° F. and which consume less than 150 SCF of hydrogen per barrel and which are further characterized by effecting little change in the content of polycyclic aromatic compounds in the oil. Usually after such hydrotreatment of a naphthenic distillate, or of a solvent refined naphthenic distillate, the hydrotreated product will contain more than 100 p.p.m. of sulfur and nitrogen.

Hydrorefining of naphthenic distillates, at temperatures in the range of about 500°–800° F. and with from 800–3000 p.s.i. of hydrogen, can be used to prepare rubber processing oils of very good ultraviolet stability. However, in order to produce light-stable oils from naphthenic distillates by such hydrorefining, the art has resorted to process conditions which reduce the aromatic content of the oil, as indicated by the consumption of fairly large quantities of hydrogen (over 150 s.c.f./b.). For an indication of the large hydrogen consumption required in hydrorefining, see for example, U.S. 2,973,315 and the copending U.S. patent application Ser. No. 622,398, of Ivor W. Mills and Glenn R. Dimeler.

Another measure used by the art to follow the severity of hydrorefining, and the resulting decrease in aromatic content of a hydrorefined oil, is to observe the decrease in ultraviolet absorbency in the 260 mM. region, herein sometimes referred to as "260 UVA." That is, due to hydrogenation of polycyclic aromatic hydrocarbons, the resulting hydrogenated oil will have a lower ultraviolet absorptivity in the 260 mM region than will the base oil before hydrogenation. With regard to the significance of the 260 UVA of conventional rubber processing oils which have not been hydrorefined, see Ziegler, J. B. et al., "Proceedings of the International Rubber Conference," Washington, D.C., November 1959, p. 432–438.

Severe hydrogenation will produce a hydrorefined oil having a 260 UVA which is at least less than 60 percent of the 260 UVA of the base oil. Typically, after severe hydrogenation, the 260 UVA is less than 10 for a 4000–10,000 SUS oil, less than 8 for a 900–3000 SUS oil, and less than 6 for a 300–800 SUS oil. For a satisfactory non-discoloring rubber process oil the art has believed that the 260 UVA must be below 6.0 regardless of viscosity.

Typically, before hydrorefining, the base oils have ultraviolet absorbencies of about 6 in the 50 SUS range, 7–10 in the 100–1000 SUS range, and can be as high as 14 for an 8000–10,000 SUS oil. Severe hydrorefining will reduce the 260 UVA (and the content of dicyclic and higher polyaromatic hydrocarbons) of a naphthenic distillate by as much as 90 percent and typically, if the oils are to be light-stable, by at least 40 percent. The corresponding decrease in the gel aromatic content of such hydrorefined rubber processing oil is typically about 25 percent but can range from 3 to 60 percent.

Table I herein shows the physical properties and chemical composition of a large number of aromatic oils which are classified in three general groups as virgin mineral oil, refined oils, or blends of white oil with synthetic plasticizers or pure aromatic compounds. The so-called "virgin mineral oils" are naphthenic distillates and solvent-extracted naphthenic distillates, which have been processed, as by caustic distillation, to remove naphthenic acids. Such processing, distillation or solvent extraction does little to decrease the content in the resulting oils of the nitrogen or sulfur containing heterocyclic aromatic compounds in virgin oils which contribute to color instability on exposure of an oil to ultraviolet light.

Table II shows the increase in color of these oils on aging for 48 hours in the presence of ultraviolet light and the color developed in a vulcanized white rubber composition, as measured by the percent decrease in reflectance on 24 hours exposure to ultraviolet light. The test procedures used to obtain results in Table II are reported hereinafter. The accompanying drawing, labelled FIG. 1, compares the reflectance change after 24 hours of exposure to ultraviolet light of a light-colored rubber vulcanizate containing 20 parts of oil per 100 parts of rubber (the rubber formulation and UV exposure conditions are described in detail hereinafter under Test Procedure B).

Each point in FIG. 1 represents the test results obtained for a given oil, triangles being used to represent oils which are relatively pure chemical compounds, circles are used to represent the data obtained for "virgin mineral oils," and square represent the data points of refined oils. Curves have been drawn which, within experimental error, connect the data points obtained for the pure compounds and for the mineral oils. The data points for the refined oil lie between these two curves.

It can be seen from Tables I and II, and from FIG. 1, that for the mineral oil group and the refined oil group, oils having a 260 UVA greater than 5 produced a decrease in reflectance of greater than 25% in the test rubber vulcanizate. It has been found that a decrease in reflectance greater than 25 percent in this test indicates that the oil will have poor ultraviolet stability in a white or light-colored rubber and is commercially unsuitable for this use. Similarly, the oils which are listed in Table I which have an aromatic content greater than 40% are unsatisfactory for use in light-colored rubbers.

TABLE I.—PHYSICAL PROPERTIES AND COMPOSITION DATA FOR OILS

| Rubber oils | Viscosity SUS at— 100° F. | Viscosity SUS at— 210° F. | Silica gel adsorption percent aromatics | Viscosity-constant gravity (V.G.C.) | Carbon type, percent $C_A$ | Carbon type, percent $C_N$ | Carbon type, percent $C_P$ | Ultraviolet adsorptivity at 260 m$\mu$ | ASTM D2007 wt. percent polar aromatics | Ratio percent PAr:percent Ar |
|---|---|---|---|---|---|---|---|---|---|---|
| Oil 1 | 515 | 54.0 | 45.0 | 0.875 | 19 | 35 | 46 | 9.5 | 5.0 | 0.111 |
| Oil 2 | 796 | 59.1 | 39.6 | 0.869 | 18 | 39 | 43 | 4.2 | 3.7 | 0.094 |
| Oil 3 | 1,025 | 68.3 | 25.2 | 0.845 | 5 | 46 | 49 | 1.0 | 1.0 | 0.040 |
| Oil 4 | 452 | 53.5 | 19.2 | 0.839 | 3 | 44 | 53 | 0.6 | 0.6 | 0.031 |
| Oil 5 | 497 | 57.0 | 23.2 | 0.832 | 4 | 40 | 56 | 1.0 | 1.1 | 0.047 |
| REFINED OILS | | | | | | | | | | |
| Oil 6 | 300 | 43.0 | 81.4 | 0.957 | 42 | 31 | 27 | 24.0 | 3.3 | 0.041 |
| Oil 7 | 300 | 43.6 | 81.4 | 0.956 | 42 | 31 | 27 | 26.0 | 2.2 | 0.027 |
| Oil 8 | 800 | 64.0 | 43.0 | 0.880 | 17 | 43 | 41 | 8.7 | 2.7 | 0.063 |
| Oil 9 | 760 | 59 | 39.6 | 0.870 | 14 | 41 | 45 | 3.9 | 2.0 | 0.054 |
| Oil 10 | 800 | 60 | 37.4 | 0.868 | 14 | 40 | 46 | 3.7 | 1.8 | 0.048 |
| Oil 11 | 790 | 60.0 | 36.7 | 0.868 | 11 | 45 | 44 | 3.9 | 1.4 | 0.038 |
| Oil 12 | 720 | 52.3 | 16.5 | 0.846 | 4 | 46 | 50 | 0.6 | 0.4 | 0.024 |
| Oil 13 | 800 | 60.0 | 44.0 | 0.881 | 16 | 42 | 42 | 3.9 | 0.9 | 0.020 |
| Oil 14 | 1,250 | 71.0 | 27.5 | 0.852 | 7 | 46 | 48 | 1.0 | 0.3 | 0.011 |
| Oil 15 | 1,250 | 70.0 | 34.0 | 0.861 | 9 | 45 | 46 | 1.6 | 0.3 | 0.009 |
| BLENDS OF WHITE OIL WITH SYNTHETIC PLASTICIZER OR PURE AROMATIC COMPOUNDS | | | | | | | | | | |
| Oil 16 | | | 40 | | | | | 4.8 | 0.3 | 0.008 |
| Oil 17 | | | 40 | | | | | 15.3 | 0.18 | 0.005 |
| Oil 18 | | | 25 | | | | | 7.5 | | |
| Oil 19 | | | 25 | | | | | 30.0 | | |
| Oil 20 | | | 25 | | | | | 25.0 | | |
| Oil 21 | | | 25 | | | | | 18.0 | | |
| Oil 22 | | | 25 | | | | | 7.5 | | |
| Oil 23 | | | 25 | | | | | 18.7 | | |

TABLE II

| Virgin mineral oil | Percent aromatics | ASTM D1500 color Initial | ASTM D1500 color Aged 48 hrs. | Reflectance values at various hours exposure— 0 hr. | Reflectance values at various hours exposure— 24 hrs. | Percent decrease in reflectance 24 hours exposure |
|---|---|---|---|---|---|---|
| Oil 1 | 45.0 | 2.25 | 6.5 | 140 | 28 | 80 |
| Oil 2 | 39.6 | 2.75 | 5.5 | 141 | 78 | 44 |
| Oil 3 | 25.2 | 1.75 | 3.0 | 145 | 126 | 13 |
| Oil 4 | 19.2 | 0.25 | 2.50 | 148 | 130 | 12 |
| Oil 5 | 23.2 | 1.25 | 3.25 | 147 | 120 | 18 |
| REFINED OILS | | | | | | |
| Oil 6 | 81.4 | | | 141 | 28 | 80 |
| Oil 7 | 81.4 | 1.75 | 4.25 | 121 | 63 | 47 |
| Oil 8 | 43.0 | 1.25 | 3.25 | 144 | 66 | 54 |
| Oil 9 | 39.6 | 1.25 | 5.0 | 145 | 85 | 42 |
| Oil 10 | 37.4 | 0.75 | 2.75 | 143 | 104 | 27 |
| Oil 11 | 36.7 | 0.75 | 2.75 | 144 | 95 | 34 |
| Oil 12 | 16.5 | 0 | 1.50 | 144 | 134 | 7 |
| Oil 13 | 44.0 | 0.75 | 4.75 | 145 | 85 | 42 |
| Oil 14 | 27.5 | 0.25 | 3.00 | 145 | 126 | 13 |
| Oil 15 | 34.0 | | | 145 | 125 | 13 |

BLENDS OF WHITE OIL WITH SYNTHETIC PLASTICIZER OR PURE AROMATIC COMPOUNDS

| Oil 16 | 40 | 0 | 1.50 | 143 | 120 | 16 |
| Oil 17 | 40 | 0 | 1.25 | 141 | 123 | 13 |
| Oil 18 | 25 | 0 |  | 152 | 134 | 12 |
| Oil 19 | 25 | 0 |  | 152 | 128 | 19 |
| Oil 20 | 25 | 0 |  | 148 | 116 | 21 |
| Oil 21 | 25 | 0 |  | 152 | 140 | 8 |
| Oil 22 | 25 | 0 |  | 152 | 30 | 81 |
| Oil 23 | 25 | 0 |  | 151 | 26 | 83 |

TABLE III.—SOURCES OF THE OILS OF TABLES I AND II

| Oil No. | Source |
|---|---|
| 1 | Naphthenic distillate.[1] |
| 2 | Furfural raffinate of 830 SUS [2] naphthenic distillate. |
| 3 | Furfural raffinate of 2,400 SUS naphthenic distillate. |
| 4 | Commercial naphthenic oil of unknown processing. |
| 5 | Commercial naphthenic oil of unknown processing. |
| 6 | HF treat of furfural extract of 150 SUS naphthenic distillate. |
| 7 | H₂SO₄ treat of furfural extract of 150 SUS naphthenic distillate. |
| 8 | HF treat of 800 SUS naphthenic distillate. |
| 9 | H₂SO₄ treat of furfural raffinate of 800 SUS naphthenic distillate. |
| 10 | HF treat of an 800 SUS furfural raffinate of an 830 SUS naphthenic distillate. |
| 11 | H₂SO₄ treat of an 800 SUS furfural raffinate of an 830 SUS naphthenic distillate. |
| 12 | HF—BF₃ treat of an 800 SUS furfural raffinate of an 830 SUS naphthenic distillate. |
| 13 | Hydrorefined 800 SUS naphthenic distillate.[3] |
| 14 | Hydrorefined 1,300 SUS furfural raffinate of a 2,400 SUS naphthenic distillate.[3] |
| 15 | Hydrorefined 1,300 SUS furfural raffinate of a 2,400 SUS naphthenic distillate.[3] |
| 16 | Butylated naphthalene. |
| 17 | Terphenyl. |
| 18 | Mixed methyl naphthalenes. |
| 19 | Phenanthrene. |
| 20 | Fluorene. |
| 21 | Biphenyl. |
| 22 | Quinoline. |
| 23 | Carbizole. |

[1] All of the naphthenic distillates in this table are substantially free of naphthenic acid.
[2] All viscosities of this table are at 100° F.
[3] Light products distilled from all hydrorefined oils to adjust viscosity.

DESCRIPTION OF THE INVENTION

The feed to the first stage or step of our two-step aromatization process is selected from those naphthenic distillates boiling mainly above 580° F. which have a viscosity in the range of 40–10,000 SUS at 100° F. and contain more than 30 percent of aromatic hydrocarbons. Such oils can contain as much as 1.5 percent of sulfur and nitrogen, a substantial amount of this sulfur and nitrogen being combined in the form of heterocyclic aromatic compounds which can either decompose in the presence of ultraviolet light or when catalyzed by ultraviolet light, can react with oxygen to form colored products.

We prefer that the naphthenic distillate which is used as the feed to the first aromatization step of our process be obtained by vacuum distillation of naphthenic crude oils (as in U.S. 3,184,396), especially those naphthenic crudes wherein the 1500–3000 SUS (at 100° F.) distillate fractions have viscosity gravity constants from 0.84 to 0.92. These naphthenic distillates should, preferably, be substantially free of naphthenic acids in order to reduce corrosion of processing equipment.

The viscosity of our naphthenic distillate feed can be adjusted by the addition of other naphthenic oils of higher or lower viscosity, as can the viscosity of the products of either stage.

For example, a non-discoloring rubber processing oil having a viscosity at 100° F. in the range of 500–2000 SUS and containing more than 55 percent of aromatic hydrocarbons, can be obtained from our process by using as a feed to the first step, a blend of a naphthenic distillate having a viscosity from 300–600 SUS with a naphthenic distillate having a viscosity from 1500–3000 SUS. A very similar non-discoloring rubber process oil can be prepared by blending a 300–600 SUS non-discoloring rubber process oil produced by our process with a 1500–3000 SUS rubber process oil produced by our process; however, a higher space rate and lower temperature, pressure, and hydrogen recycle can be used in each stage for the processing of the lower viscosity feed.

It is sometimes advantageous with the more highly viscous oils, such as those having viscosities at 100° F. greater than about 5000 SUS, to dilute the oil with a less viscous relatively low boiling aromatic hydrocarbon which is substantially free of nitrogen and sulfur, such as a desulfurized gas oil, to decrease the viscosity of the feed to either stage, and then to remove this aromatic hydrocarbon diluent, as by distillation, to produce a rubber process oil of the desired viscosity and flash point.

Although our feed oils or the resulting products of either stage can be further refined as by conventional treatment with sulfuric acid or by solvent extraction, the improvement in the oil properties imparted by such treatment is not sufficient to justify the expense involved and also, such treatment tends to decrease the aromaticity of the final rubber process oil.

In the first aromatization step of our process, we prefer to use a catalyst prepared by sulfiding a composition comprising nickel-molybdenum oxides, preferably on a carrier such as silica, alumina, alumina-titania, and alumino-silicates (either crystalline or amorphous). Cobalt and/or tungsten can also be present in such a composite, in addition to nickel and molybdenum. We prefer that our nickel-molybdenum sulfide catalyst be presulfided, that is, that hydrogen and H₂S or hydrogen and carbon disulfide be passed through a bed of the oxide catalyst at a temperature and pressure (e.g. 200–500 p.s.i.g., 300–500° F.) such that substantially all of the oxide of the catalyst is converted to sulfide form, prior to introducing the feed stock. Nickel-molybdenum sulfide per se or on a carrier can also be used as the catalyst.

We prefer a sulfided nickel-molybdenum hydrogenation catalyst in our first aromatization step because this catalyst effects a greater degree of nitrogen and sulfur removal at a given temperature, pressure, space rate and hydrogen recycle rate than can be obtained with other solid sulfactive hydrogenation catalyst such as molybdenum oxide, nickel oxide, cobalt molybdenum oxide, cobalt nickel-molybdenum oxide, and tungsten-nickel molybdenum oxide or the corresponding sulfides of these oxides. The nickel-molybdenum oxide catalyst will usually produce a lighter colored step 1 product at a higher volume yield (of a product of acceptable flash point) than can be obtained under similar process conditions with the other sulfactive catalysts.

Therefore, the use of a sulfided nickel-molybdenum catalyst in our first aromatization step allows us to use a smaller quantity of the more expensive second catalyst and allows the production of more highly aromatic, more stable rubber process oils in higher yield than can be produced with another sulfactive catalyst in the first stage. If, however, the refiner is primarily interested in increasing the aromaticity of a naphthenic oil for use in the more highly colored rubber formulations, and if economics will allow him to operate a lower yield process than that of our invention, a sulfactive catalyst other than sulfided nickel-molybdenum oxide can be used as a first stage aromatization catalyst and the product of this stage can be further aromatized, decolorized and stabilized in our second aromatization stage. Examples of such operable catalysts are those of U.S. 2,744,052; 2,758,957; 3,053,760; 3,182,016; 3,205,165; 3,227,646 and 3,264,211.

As is illustrated by the product properties listed at Col. J of Tables IV and V herein, it is possible with the proper choice of temperature, pressure, feed space rate and hydrogen recycle rate to obtain a light colored first step aromatized oil with sufficient ultraviolet stability to be useful in white or light colored rubber formulations. However, if such a single step product, or a major portion thereof, is further processed in a second aromatization step according to our invention, a more highly aromatic oil having equivalent or better color stability can be obtained. In addition, our two-step aromatization process allows for significantly greater volume yields of an oil of a given aromaticity and degree of color stability than can be obtained by a single step aromatization process.

In our second aromatization step, we prefer to use a solid hydrogenation-dehydrogenation catalyst comprising at leaste one metal selected from the group consisting of nickel, platinum, palladium and rhodium. Usually, these catalysts are prepared by reduction, with hydrogen, of the metal oxide on a carrier, such as silica, alumina and alumino-silicates (either crystalline or amorphous). Where hydrodemethylation, in addition to aromatization, is desired in the second step, the catalyst can also consist of iron or cobalt; however, such catalysts give a significantly inferior second stage product when used under the same processing conditions as our preferred catalysts.

The temperature in either step must be below 775° F. in order to prevent substantial product losses and color degradation due to hydrocracking. With the usual naphthenic distillates, the temperature must be at least 550° F. in the first aromatization step in order to obtain a product from this step which contains less than 100 p.p.m. of sulfur and nitrogen and a greater percentage by weight of aromatic compounds than are contained in the naphthenic distillate feed.

The minimum temperature at which either step 1 or step 2 can be operated is that at which aromatization of the feed begins to occur. Preferably, the temperature in each aromatization step is in the range of 675°–775° F. and the pressure and hydrogen recycle are adjusted such that at least a major portion of the feed is in vapor phase, e.g., mixed phase, and preferably such that substantially all of the feed is in vapor phase. Such vapor phase or mixed phase operation is necessary with the usual naphthenic distillates of high sulfur and nitrogen content in order that the first stage product will contain less than 100 parts per million of sulfur.

In order to maintain mixed or vapor phase with our naphthenic distillate feeds which at atmospheric pressure boil mainly above 580° F. and which can contain a significant volume of material boiling mainly above 750° F., we prefer to operate at a pressure below 1500 p.s.i.g. and with a hydrogen recycle of at least 2000 s.c.f./b.

A high hydrogen recycle increases the proportion of the feed which is in vapor phase at a given temperature and pressure. We have also found, surprisingly, that a high hydrogen recycle improves the color of the aromatized oil which is produced at a given temperature and pressure. With the more highly viscous naphthenic distillates, having viscosities in the range of 100–1000 SUS at 100° F., the contacting of step (a) should be at a temperature in the range of 650°–775° F. and at a hydrogen recycle greater than 500 s.c.f./b. in order to maintain the feed substantially in vapor phase and to produce a relatively light colored product containing less than 75 p.p.m. of sulfur and less than 10 p.p.m. of nitrogen and which contains at least 10 percent more aromatic hydrocarbons than were contained in the naphthenic distillate feed of the first aromatization step.

As the 100° F. viscosity of the feed increases, so must the hydrogen recycle rate in the first step. A 100 SUS feed requires a first-stage hydrogen recycle of about 3000 s.c.f./b. (preferably greater than 500 s.c.f./b.). A 500 SUS feed requires a first-step hydrogen recycle of at least 5000 s.c.f./b., and preferably of at least 4000 s.c.f./b. of substantially H$_2$S-free hydrogen in the second step. For a naphthenic distillate having a viscosity greater than 2000 SUS, containing more than 45 percent of aromatic hydrocarbon and having a 260 UVA greater than 9.0, the gas recycle in step (a) should be greater than 7000 s.c.f./b. For naphthenic distillates having viscosities in the range of 8000 SUS and above, hydrogen recycle as high as 12,000 s.c.f./b. may be required, in the first aromatization step, in order to effect the desired degree of sulfur removal and increase of aromaticity, and to obtain a relatively light color in the first stage oil.

Although the product of our second aromatization step will have a lighter color than the portion of the first step product which is the feed to this step, we prefer that conditions in the first stage be controlled such that the feed to the second aromatization step has an ASTM D1500 initial color of less than 4.0. In order to produce a non-discoloring rubber oil the product of the second step must have an ASTM D1500 color of less than 2.0 and preferably less than 1.5. This requires that the feed to the second step be no darker than 4.0. Therefore, a first stage product such as that of Run E of Tables IV and V is too highly colored to be a preferable feed to the second stage. In contrast, the product of Run D in Table IV is a good feed for our second stage.

Similarly when the feed used in Runs C and D is contacted in our first step under the same conditions as in C and D but at a temperature between 750 and 770° F., the first step product will have an acceptable D1500 color and will also contain a high percent of aromatic hydrocarbons, intermediate between that of product C and D.

Runs A–K of Tables IV and V and Run L of Table VII were made on a naphthenic distillate feed having a viscosity in the 50 SUS range. These runs indicate the direction of the change in feed properties which can be produced at the indicated temperature and pressure with a more viscous naphthenic distillate feed. That is, the changes in color, 260 UVA, gel aromatic content, and the volume percent of overhead product, will be in about the same proportion for the more viscous, higher boiling naphthenic distillates (e.g. 100–10,000 SUS) as are shown herein for a 50 SUS distillate feed, if with a higher viscosity feed stock the hydrogen recycle rate is increased so as to maintain substantially all of the feed stock in vapor phase or (at least) in mixed phase. For example, the temperature, pressure and space velocity of Run J can be used in the first stage of our process to obtain satisfactory decrease in sulfur and nitrogen and a satisfactory increase in aromaticity of naphthenic distillates having viscosities from 50 SUS to as high as 10,000 SUS if with the more viscous feed the gas recycle is increased such that the product of step 1 has an ASTM D1500 color of less than 4.0, and preferably less than 2.0.

Similarly, although the conditions of Run K can be used to produce a first stage product having high aromaticity, low sulfur and nitrogen, and a satisfactory color, they will greater favor hydrocracking of any naphthenic distillate feed having a viscosity in the range of 40–10,000 SUS and are unsatisfactory conditions in our first stage because the degree of product degradation is too great to be economical in most instances. Note in Runs F, G, J and K that the initial color is light and is about the same for each product. This indicates that 3000 s.c.f./b. is an adequate hydrogen recycle for the feed used.

In our second aromatization step, utilizing a hydrogenation-dehydrogenation catalyst comprising at least one metal selected from the group consisting of cobalt, platinum, palladium, and rhodium, the conditions must be chosen such that the product of the second step contains less than 10 p.p.m. of sulfur and nitrogen, preferably less than 5 p.p.m. and also contains a greater percent by weight of aromatic hydrocarbons than did the first stage product. When light boiling components of the product of our second step are removed as by distillation so that the product has the same initial flash point as the product of our first step, the second step product will have a greater color stability when aged in the presence of ultraviolet light than will be first step product.

The second step product will also have a D1500 color which is no darker than the feed to the first step, and will usually have a lighter color. Our reduced first stage product will have a color stability when aged in the presence of ultraviolet light which is at least as good as that of a conventionally refined naphthenic distillate or furfural extracted naphthenic distillate of about the same viscosity, and yet will contain at least 20 percent more aromatic compounds, and will have a greater 260 UVA.

Our second step aromatization is preferably at a pressure at least 20 percent less than the pressure of our first step, and at conditions such that the product of the second step contains at least 3 percent and preferably more than 10 percent more aromatic hydrocarbons than does the product of the first step. Gas recycle is less critical in our second aromatization step than in the first step. When a gas recycle is used the recycle gas must be processed, as by soda lime absorption, or caustic scrubbing, so that the recycled gas is substantially free of $H_2S$. When the portion of the product of step (a) which is used as a feed to step (b) boils mainly above 580° F. and has a viscosity in the range of 100–10,000 SUS at 100° F. we prefer that the gas recycle in the second aromatization step be at least 4000 s.c.f./b. and that the LHSV of the feed to step (b) be from 0.10 to 1.0 volume of feed per volume of catalyst per hour.

When our catalyst in the second aromatization step has hydrodemethylation activity, as when the catalyst contains nickel, and/or cobalt and/or iron, methane will be produced during the aromatization if the first stage conditions have been such that the feed to the second aromatization step contains alkyl-substituted tricyclic or higher naphthenic or aromatic ring compounds. Frequently, such hydrodemethylation will consume more hydrogen than is produced by the simultaneous aromatization of the second step feed, therefore, our second step aromatization can be operated under conditions such that the second step is a net consumer of hydrogen. In this respect our second stage aromatization is to be contrasted with such aromatization processes as that of U.S. 2,889,273 wherein in a second stage aromatization large quantities of hydrogen are produced (on the order of 200–400 s.c.f./b.). In the case of U.S. 2,889,273 the feed is not a naphthenic distillate as in our process but a gas oil, boiling mainly below 560° F. Such a feed stock is unsuitable for the manufacture of a rubber oil by our process due to the low molecular weight of the hydrocarbons therein, and the low viscosity of the resulting aromatized product. Another difference between our two-stage aromatization process and certain prior art two-step processes is that the conditions which we use in our first step do not favor saturation of olefinic and aromatic bonding in the feed stock and hydrocracking is minimized. With a naphthenic distillate feed boiling mainly above 580° F. a first stage process such as that of the example in U.S. 2,889,273 favors saturation of bonding and hydrocracking and the refined product from such a first step does not contain a greater percentage by weight of aromatic hydrocarbons than did the feed to the step.

Our two-stage aromatization process is particularly useful for producing a non-discoloring rubber process oil having a viscosity greater than 100 SUS at 100° F., a flash point greater than 340° F. and containing from 45–70 percent of aromatic hydrocarbons. As has been shown in the paper presented before the American Chemical Society, Division of Rubber Chemistry, New York, N.Y., on Sept. 16, 1966 by Mills et al., naphthenic oils of this aromatic content and in particular in the range of 45–60 percent of aromatic hydrocarbons are particularly advantageous for compounding with certain types of E.P.D.M. polymers, particularly at oil loadings of 50 parts by volume and greater per 100 parts by weight of polymer.

For example, with an E.P.D.M. polymer having a raw Mooney (M.L. 4) of 72, an iodine number of 17 and containing 8 weight percent of diene, when compounded with naphthenic oil containing 45–60 percent of aromatic hydrocarbons, will have good processing characteristics, such as extrusion rate, and the resulting rubber article will have better tensile properties than will a similar compound containing an equal volume of an oil of lower aromaticity.

In particular, the rubber article containing the 45–60 percent aromatic naphthenic oil will have a higher tensile, higher tear strength, and a much greater modulus (100%) after aging 70 hours at 302° F. than will a rubber containing an equal volume of a 30–35 percent aromatic oil. In addition, when the 45–60 percent aromatic oil is one of the novel oils disclosed herein, the color of the rubber product after aging in the presence of sunlight will be no darker (and will usually be lighter) than the color of a similarly compounded rubber article containing a prior art naphthenic oil of 30–35 percent aromatic content.

Our novel non-discoloring oils having a viscosity, from 40–100 c.p.s. (and containing 50–85% aromatics) are of particular advantage when compounded with a vinyl elastomer as in the following formulation:

|  | Parts |
|---|---|
| Vinyl resin (Pliovic AD-2) | 100 |
| Dioctylphthalate | 75 |
| Oxidation stabilizer (Advance BC–110) | 1.5 |
| Oil (40–100 c.p.s. @ 100° F.) | 5–20 |

Our novel oils, containing at least 50 percent of aromatic hydrocarbons, are also especially useful in the manufacture of sponges containing neoprene rubber. In such neoprene sponge compounding, a greater proportion of oil to rubber is possible, using our oils, than with prior art oils having equivalent color stability upon ultraviolet light aging. A typical sponge rubber formulation in which our novel oils are of particular advantage is as follows:

| Component: | Parts by weight |
|---|---|
| Neoprene GN | 100 |
| Extra light calcined MgO | 4 |
| Neozone A (accelerator) | 2 |
| Akroflex C (antioxidant) | 3 |
| Petrolatum | 3 |
| Filler (whitening, etc.) | 0–200 |
| Oil (50–70% aromatics)—150 SUS at 100° F. | 15–55 |
| Unicel (blowing agent) | 2 |
| ZnO | 5 |

In such a sponge formulation, no more than about 40 parts of prior art oils containing 30–35 percent aromatics could be successfully compounded since greater quantities of such oils were not compatible with neoprene. In addition, in such a formulation even the 35 percent aromatic prior art oils tend to impart unsatisfactory color stability on ultraviolet aging.

ILLUSTRATIVE EXAMPLES

In the following examples, Example I illustrates practice of our invention under conditions such that there is a net production of hydrogen in the first aromatization step and a net consumption of hydrogen in the second aromatization step wherein methane is produced. Examples II and III show that if the temperature is too low and the pressure is too high in our second stage, the resulting refined oil would be of decreased rather than of increased aromaticity. Example IV shows our process under conditions such that there is a net consumption of hydrogen in our first stage and a net production of hydrogen in our second stage. Example V shows the relative stability of the color of the oils of the examples when they are aged in the presence of UV light in our Test Procedure A. Example VI illustrates the good ultraviolet stability which can be obtained from a rubber compound containing our novel rubber process oil.

EXAMPLE I

One barrel of a naphthenic distillate having the properties indicated in Col. L of Table VI is heated to 750° F. and contacted, in an isothermal reactor, with a fixed bed of a sulfactive hydrogenation catalyst in the presence of 500 p.s.i.g. of 100 percent hydrogen at 750° F. The naphthenic distillate is obtained by caustic distillation of a naphthenic crude blend having a viscosity-gravity constant of 0.890. The catalyst is prepared by substantially completely sulfiding (300 p.s.i.g., 400° F.) nickel-molybdenum oxides (3% NiO, 15% MoO$_3$) on alumina.

With this naphthenic distillate feed, the "autofining" temperature is at about 750° F. The autofining temperature is the temperature at which the amount of hydrogen evolved from the oil by the conversion of naphthenes to aromatic hydrocarbons is equal to the amount of hydrogen consumed by the conversion of nitrogen and sulfur containing compounds in the oil to H$_2$S and NH$_3$. The temperature in the reactor is increased, by increasing the temperature of the feed hydrocarbon and hydrogen, to the point where there is a substantial evolution of hydrogen from the reactor. The resulting reaction temperature is 755° F., which is significantly above what would normally be considered the autofining point with regard to hydrogen balancing (that is, there is a net production of hydrogen).

Hydrogen feed to the reactor is discontinued and sufficient hydrogen gas is continuously removed from the reactor to maintain pressure at 500 p.s.i.g., with a gaseous recycle of 5000 s.c.f./b. and the naphthenic feed is passed through the catalyst bed at an LHSV of 1.0 volume of oil per volume of catalyst per hour. Under these conditions the feed is substantially in the vapor phase, naphthenic compounds in the feed are converted to aromatic hydrocarbons, and the hydrogen evolved is used, in part, to convert heterocyclic nitrogen and sulfur compounds in the oil to H$_2$S and NH$_3$, which are removed from the reactor in the reaction gases.

2.67 pounds of reaction gases are produced in the first stage from a barrel of feed, weighing 317.06 pounds. Table VII lists the composition of these gases, of which about 10 percent is hydrogen. Of the 5000 s.c.f./b. of recycle gases, 75 percent is hydrogen. Of the liquid product, the C$_6$–485° F. fraction (the overhead) is 14.15 pounds per barrel of feed, and the 485° F.+liquid product is 300.24 pounds per barrel. This is a yield of 0.942 barrels per barrel of feed. The volume of the gases produced is 85 s.c.f./b.

The liquid product of this first aromatization step has a light green color and, when the fraction boiling below 485° F. is removed by distillation, the resulting oil is the same light green color and has the properties indicated at Col. M in Table VII. The topped oil contains 0.8% polar compounds by ASTM D2007-62%. Note that the front end is only 4.9 volume percent. This and the relatively low percentage of hydrocarbon gases produced indicates that there is little feed degradation due to hydrocracking in this step.

The entire liquid product, including the front end, of the first aromatization step is contacted at 750° F., 0.5 LHSV and 150 p.s.i. of hydrogen in a second step with a fixed bed of a hydrogenation-dehydrogenation catalyst consisting of nickel metal on Kieselguhr. The catalyst is prepared by reduction of an NiO (44%)-Kieselguhr composite. 5000 s.c.f./b. of hydrogen was passed through the reactor with no hydrogen recycle. 150 s.c.f. of hydrogen are consumed in the reactor per 0.991 barrel of feed and 124 s.c.f. of gases were evolved, weighing 5.26 pounds, of which 5.23 pounds were methane. The only other products present in the product gases of any appreciable extent were 0.01 pound of H$_2$S and 0.02 pound of NH$_3$, per barrel of oil.

0.105 barrel (31.3 pounds) of overhead (485° F.—) was separated from the liquid product to give a yield of 0.74 barrel (278.66 pounds) of a very light green colored aromatic hydrocarbon fluid having the properties listed in Col. Q of Table VI.

Of the net consumption of 159 s.c.f./b. of hydrogen in this second stage, about 124 s.c.f. is used to produce the water, H$_2$S and methane, and the remainder, plus the hydrogen produced in increasing the aromatic content of the oil, is probably consumed in producing the 485° F.— front end or overhead. Note that the total front-end produced in the two-step aromatization of this example is only 10.8 percent, or about 5 percent per step. This, in combination with the small amounts of gases produced and the viscosities of the 485+ liquid products, indicates that there is minimal degradation of the feed stock due to hydrocracking, and that the main degradation reaction occurring in the second step of this example is hydrodemethylation.

Hydrodemethylation in the second step of our process is beneficial in that it is believed that the methane comes from alkylsubstituted tricyclic and higher aromatic hydrocarbons and that these alkyl groups contribute in part to the instability of the color of an oil when exposed to ultraviolet light, particularly in the presence of oxygen.

Substantially the same results are obtained when the naphthenic distillate used as feed to the first stage has a viscosity (at 100° F.) of 300, 800, 2400 or 8000 SUS when the hydrogen recycle in the first stage is at 6000, 7000, 8000 or 10,000 s.c.f./b., respectively.

EXAMPLE II

Example I was repeated except that reaction temperature is 650° F. and the reactor is maintained at a pressure of 750 p.s.i.g. of hydrogen. The portion of the resulting product of the second aromatization stage, topped to remove overhead, is characterized in Col. N of Table VI. Note that the topped product contains only a 11.7 percent of aromatic hydrocarbons and has a 260 UVA of 0.36, indicating the virtual absence of dicyclic and higher aromatic hydrocarbons in the oil. Note also that the volume percent of front ends is 12.5, which indicates that more hydrocracking occurs than in Example I.

EXAMPLE III

Example I is repeated except that the reaction temperature is 675° F. and the reaction pressure is maintained at 750 p.s.i.g. The resulting product is characterized at Col. P of Table VI. Note that the topped product contains only 31.2 percent aromatic hydrocarbons (compared to 49.9 percent in the feed to the second stage). However, this is almost three times the aromatic content of the corresponding product of Example II. This indicates that as the reaction temperature is increased above 675° F., at 750 p.s.i.g., a temperature can be reached (ca. 740° F.) at which the resulting product will contain more aromatic hydrocarbons than were present in the original base oil (40.2% in this case).

EXAMPLE IV

Example I is repeated except that the naphthenic distillate used as the feed to the first step is that indicated on Table IV in the row labelled "charge stock" and the reactor temperature in the first stage is 775° F., the hydrogen pressure 1000 p.s.i.g., the gas recycle 3000 s.c.f./b. and in the second stage the catalyst is 1% Pt on eta-alumina. The total liquid product of the first stage is green and is characterized at Col. J of Table IV. Note that this product contains much less sulfur and nitrogen than does the first stage product in Example I, but that more than three times as much overhead liquid is produced.

The low sulfur of the first stage product of this example allows a much longer catalyst life of the second stage, particularly with a nickel catalyst, than does the higher sulfur content first stage product of Example I. However, in our process, catalyst life, particularly with a platinum on alumina catalyst and an H$_2$S-free hydrogen recycle greater than 5000 s.c.f./b., is sufficiently long even with a 75 p.p.m. sulfur first stage feed, that the increase in catalyst life obtainable by using a first stage condition as in this example is not as economical as to utilize the first stage conditions of Example I and obtain higher product yields.

In the second stage, hydrogen is evolved and the resulting topped product contains 61% of aromatic hydrocarbons.

EXAMPLE V

The naphthenic distillate of Example I (L in Table VI), and the topped products of the first and second stages of each of the preceding examples are aged for 48 hours in the presence of ultraviolet light under the conditions reported below as Test Procedure A. The resulting aged colors, except for the product of Run J, are reported in Table VI as "48 Hr. UV." All except Run M are suitable for use in white rubber compositions. The 485° F.+ product of the first stage of Example IV (Run J) has a light-orange, D1500 color of 3.0 after 48 hours of UV aging (initial color is 0.75 and green). The product of the second stage of Example IV has an aged (light orange) color of 2.5.

It is surprising that the first stage product of Example I, containing 49.9% aromatics, has very unsatisfactory color stability on UV aging and that the more highly aromatic (53.7%) second stage product has very satisfactory UV stability. It is also surprising that the stability of the color of the second stage product of Example I is slightly better than that of the less aromatic (48.2%) first stage product (Run J) of Example IV.

Test Procedure A

To determine the relative color stability of an oil on aging in the presence of ultraviolet light, 30 cc. of the oil is placed in an aluminum dish 2.5 inches in diameter. The dish is then placed in a test chamber 2 x 2 x 2.5 feet and exposed to 2 RS type 275 watt sun lamps while air from a blower is passed through the test chamber at a rate such that the temperature in the chamber is equilibrated at 145° F. At the end of the aging period the ASTM D1500 color is determined for each oil. Preferably, all samples to be compared are run at the same time or an oil of known UV performance is run with each batch and used as a control or standard.

As is seen in FIG. 2 a straight line can be drawn which provides reasonable correlation between the aged color of an oil and the amount of stain imparted by the oil to a test rubber sample upon 24 hours of UV aging.

EXAMPLE VI

Example I is repeated except that the naphthenic distillate feed has a 260 UVA of 10.1, contains 0.25% sulfur, 280 p.p.m. of nitrogen and has a viscosity of 800 SUS at 100° F. and in the first aromatization step the temperature is 760° F., the pressure 600 p.s.i.g. and the hydrogen recycle is 6000 s.c.f./b. The product of the second stage (topped to 800 SUS) is light green, contains less than 10 p.p.m. of sulfur and nitrogen, and contains 59% of aromatic hydrocarbons.

This 59% aromatic oil (20 parts) is compounded with SBR rubber and aged by UV light using the test formulation and aging method procedure B herein. The resulting aged test rubber composition shows a decrease in reflectance after 24 hours of exposure, of 22%. This is surprisingly good color stability for such a highly aromatic oil.

Test Procedure B

The color stability is determined by the reflective measurements for the rubber samples and the aging procedure which are described in the previously cited article by Ziegler et al. The rubber formulation used in these tests differs from that used by Ziegler et al. in that a peroxide cure was substituted for the sulfur cure of Ziegler et al. This change was made because we have found that peroxide as a curing agent does not impart as great a color change to rubber as does sulfur on exposure to ultraviolet light. Thus, by using recrystallized dicumyl peroxide as the curing agent, a more precise evaluation of color stability of oil in rubber can be made in that a small change of color imparted to the rubber formulation by the oil as it ages will not be masked by a greater color change caused by the curing agent. The rubber formulation used in these tests is as follows, in parts by weight:

| | Parts |
|---|---|
| SBR 1503 | 100.0 |
| Zinc oxide | 10.0 |
| Titanium dioxide | 10.0 |
| Recrystallized dicumyl peroxide | 2.0 |
| Test oil | 20.0 |

FIG. 2 shows that there is good correlation between the color developed in an oil on 48-hour exposure to ultraviolet light and the decrease in reflectance of a rubber vulcanizate on 24-hour exposure to ultraviolet light. This correlation can be used as an indication of the suitability of a given oil for use in a light colored rubber composition.

The points on FIG. 1 (at 8.8 UVA, 17%) and FIG. 2 (at 2.75, 1%) designated by a star, are representative of the results obtainable with one of our novel oils containing 54% of aromatic hydrocarbons and less than 5 p.p.m. of sulfur and nitrogen.

Table II indicates the sources of the various oils reported in Table I and Table II. These oils are representative not only of the prior art preparations of rubber oils, but also are representative of certain unpublished processes which utilize hydrofluoric acid treatment.

Another use for an oil prepared by the two stage hydroaromatization process disclosed herein is as a refrigerator oil or as a component of a blended refrigerator oil. Such refrigerator oils comprising two-stage hydroaromatized oils (especially hydroaromatized oils containing from 45–85 weight percent aromatics), when utilized in compressors operating at high temperatures, exhibit better thermal stability (e.g., less coking at valves) than prior art oils of the same aromaticity.

For use in such refrigerator oils, the feed stock to our process need not be a naphthenic oil containing more than 30 weight percent aromatics but can be any petroleum stock in the lubricating oil boiling range which contains naphthene hydrocarbons and which has a viscosity at 100° F. in the range of 30–20,000 SUS; however, with the more highly viscous stocks (e.g., 2000+SUS) dilution with a less viscous oil (e.g., 100–SUS) is frequently preferred (such blending can be similar to that described in U.S. Pat. No. 3,425,932). Typical of such petroleum stocks are dewaxed paraffinic distillates, naphthenic distillates (preferably free of naphthenic acids), aromatic distillates, hydrocracked lubes and the raffinates or extracts produced by contacting such hydrocracked lubes or distillates with an aromatic selective solvent (e.g., phenol, furfural, etc.).

Therefore, a broad embodiment of our invention is a process for the manufacture of an aromatic hydrocarbon fluid, useful as a non-discoloring rubber processing oil (or as a refrigerator oil), comprising catalytic contacting of a petroleum stock in the lubricating oil boiling range, which has a viscosity in the range of 30–20,000 SUS at 100° F., contains non-hydrocarbon impurities comprising organic heterocyclic sulfur and nitrogen compounds and contains naphthene hydrocarbons which are capable of being converted to aromatic hydrocarbon, the catalytic contacting being with a solid sulfactive hydrogenation-dehydrogenation catalyst in the presence of hydrogen and at a temperature, space velocity and pressure such that less than 15 volume percent of said petroleum stock is converted to materials boiling below 485° F., whereby the resulting refined product contains less than 100 p.p.m. of sulfur and a greater percentage by weight of aromatic hydrocarbons than is contained in said naphthenic distillate feed, said temperature being below 775° F. and said pressure being maintained below 1500 p.s.i.g., and then contacting at least a major portion of the product of such catalytic contacting in the presence of hydrogen with a solid hydrogenation-dehydrogenation catalyst comprising at least one metal selected from the group consisting of nickel, platinum, palladium, rhenium and rhodium, the contacting being at a temperature below 775° F. and at a space rate and pressure such that the product of such contacting contains less than 10 p.p.m. basic nitrogen and a greater percent by weight of aromatic compounds than did the portion of the product of the first catalytic contacting and wherein the product of the second catalytic contacting, when topped to the same initial flash point as the product of the first catalytic contacting, has a greater color stability when aged in the presence of ultraviolet light than the product of the first catalytic contacting. The temperature, space velocity and pressure in the catalytic contacting stage are preferably chosen such that less than 10 volume percent of the feed to this second stage is converted to materials boiling below 485° F. The presence of up to 500 p.p.m. of indigenous nitrogen in the feed to this second stage can aid in reducing hydrocracking in the second stage; therefore, the emphasis in the first stage can be placed on sulfur removal, at the expense (if necessary) of efficient nitrogen removal. However, the basic nitrogen in the second stage product must be less than 10 p.p.m. (and preferably less than 5 p.p.m.) if the product is to be used in refrigerator oils or light-colored rubber without additional processing (as with acidic clay).

Preferred products of this two-stage process are the novel hydrocarbon oils previously referred to herein.

Although the bulk of the nitrogen-containing compounds can be removed from a highly aromatic mineral oil stock by contacting the stock with an acid (e.g., $H_2SO_4$, HF, etc.), such acid contacting will also remove the bulk of the polycyclic aromatic hydrocarbons which contribute to the ultraviolet absorptivity of the oil at about 325 millimicrons. A characteristic of certain of our preferred novel oils is that they contain less than 10 p.p.m. of basic nitrogen and also have a 325 UVA of at least 0.2 (and, more preferred, at least 0.4). The 335 UVA in such hydroaromatized oils can also be greater than 0.1 (more preferred, at least 0.2). Rostler analysis of our novel hydroaromatized oils will frequently indicate a higher content of Group I unsaturates than will be found in a prior art acid-treated oil of equivalent gel aromatic content and initial ASTM color.

An especially useful catalyst for the second aromatization stage (particularly when the feed to the second stage contains less than 25 p.p.m. sulfur) is a combination of rhenium and platinum, preferably on an alumina support (e.g., see U.S. Pat. No. 3,415,737 to Kluksdahl).

The unclaimed disclosure herein relating to rubber compositions plasticized with acid-treated (e.g., HF) mineral oil which contains from 10–45 wt. percent aromatics (e.g., see Tables I, II and III herein) is related to the invention claimed in said Ser. No. 657,438 which in turn is a continuation-in-part of Ser. No. 547,670, filed May 4, 1966, which was a continuation-in-part of Ser. No. 186,-825, filed Apr. 6, 1962, now abandoned which was a continuation-in-part of Ser. No. 822,155, filed June 22, 1959, now abandoned, which was a continuation-in-part of Ser. No. 409,478, filed Feb. 10, 1954 and now abandoned.

The unclaimed disclosure herein relating to a novel light-colored rubber vulcanizate having good color stability when exposed to ultraviolet light and containing petroleum oil of 45–85% aromatic content (e.g., see page 2, lines 28–31 and page 3, line 19) is related to the invention claimed in said Ser. No. 636,493 of which the present application is a continuation-in-part.

The unclaimed disclosure herein relating to increasing the 335 UVA of a hydrorefined oil by catalytic aromatization of a more saturated polynuclear hydrocarbon present in the oil to produce a polynuclear hydrocarbon which contributes to the 335 UVA, is related to the invention claimed in said Ser. No. 730,999.

The unclaimed disclosure herein relating to contacting a lubricating oil distillate stock with hydrogen in the presence of a hydrogenating component selected from the group consisting of sulfides and oxides of (a) molybdenum and at least two iron group metals and (b) a combination of nickel and tungsten, said contacting being carried out at a temperature of about 500°–800° F., at a space velocity of about 0.1–8.0 liquid volumes of oil per volume of catalyst per hour based on the fresh feed, and at a pressure of about 500–3000 p.s.i. of hydrogen, the combination of conditions being so selected as to effect appreciable hydrogen consumption but no substantial cracking is related to the invention claimed in said Ser. No. 812,516.

The unclaimed disclosure herein relating to hydrorefined oils having a viscosity in the range of 100–12,000 SUS at 100° F. and containing 10–44 wt. percent gel aromatics and less than 10 p.p.m. of basic nitrogen is related to the invention claimed in said Ser. No. 850,717.

TABLE IV

| | Run designation | | | | | | | | | | | Charge Stock 1217 |
|---|---|---|---|---|---|---|---|---|---|---|---|---|
| | A | B | C | D | E | F | G | H | I | J | K | |
| Temperature, °F | 650 | 700 | 725 | 750 | 775 | 750 | 725 | 725 | 700 | 775 | 800 | |
| Pressure, p.s.i.g | 1,000 | 1,000 | 1,000 | 1,000 | 1,000 | 1,000 | 1,000 | 600 | 600 | 1,000 | 1,000 | |
| LHSV, hr.$^{-1}$ | 1.0 | 1.0 | 1.0 | 1.0 | 1.0 | 1.0 | 1.0 | 1.0 | 1.0 | 1.0 | 1.0 | |
| Gas recycle, s.c.f./b | 0 | 0 | 0 | 0 | 0 | 3,000 | 3,000 | 3,000 | 3,000 | 3,000 | 3,000 | |
| Product quality: | | | | | | | | | | | | |
| D1500: | | | | | | | | | | | | |
| Initial | <0.25 | 0.5 | 1.0 | 1.5 | 4.75 | 1.00 | 0.75 | 1.25 | 0.75 | 0.75 | 0.75 | 1.0 |
| Aged | 0.25 | 0.5 | 1.0 | 1.75 | 6.75 | 2.00 | | | 0.75 | 0.75 | 0.75 | 1.25 |
| O.D.: | | | | | | | | | | | | |
| Initial | 1.0 | 3.0 | | | | 0.7 | 2.1 | 2.3 | 2.0 | 2.2 | 2.0 | 9.0 |
| Aged | 1.0 | 2.0 | 4.0 | 6.0 | 240 | 7.0 | 2.4 | 4.0 | 2.0 | 2.3 | 2.4 | |
| 260 UVA | 1.2 | 1.2 | 2.2 | 4.9 | 11.6 | 3.2 | 2.0 | 4.6 | 3.0 | 4.0 | 5.8 | 5.3 |
| Gel aromatic, wt. percent | 33.8 | 29.1 | 32.1 | 47.4 | 63.0 | 41.8 | 35.7 | 42.5 | 38.2 | 48.2 | 55.9 | 39.4 |
| Mono | 31.6 | 25.8 | 27.1 | 36.1 | 37.8 | 35.2 | 31.3 | 32.2 | 31.9 | 40.8 | 44.4 | 25.0 |
| Di | 1.1 | 2.1 | 3.8 | 8.9 | 20.0 | 5.0 | 3.5 | 8.1 | 4.9 | 5.3 | 8.5 | 12.9 |
| Tri | 1.1 | 1.2 | 1.2 | 2.4 | 5.2 | 1.6 | 0.9 | 2.2 | 1.4 | 2.1 | 2.9 | 1.5 |
| Refractive index | 1.4916 | 1.4873 | 1.4887 | 1.4961 | 1.5102 | 1.4922 | 1.4910 | 1.4986 | 1.4957 | 1.4926 | 1.4950 | 1.5021 |
| R.I. | 105 | 148 | 134 | 60 | 81 | 99 | 111 | 35 | 64 | 95 | 71 | |
| Viscosity, 100° F. (SUS) | 55.0 | 50.0 | 47.7 | 44.2 | 40.4 | 44.7 | 49.0 | 50.2 | 43.2 | 41.6 | 38.0 | |
| Flash, °F | 270 | 240 | 215 | 180 | 165 | 200 | 210 | | 270 | | 160 | |
| Molecular wt | 253 | 251 | 237 | 238 | 227 | 245 | 250 | 250 | 253 | 235 | 230 | 255 |
| S, p.p.m | 32 | 7 | 7 | (4) | (2) | 2 | 1 | 2 | | 3 | 2 | |
| N, p.p.m | 1.0 | 1.2 | 2.3 | 7.8 | 1.4 | 1.1 | 4.5 | 4.0 | 1.7 | 1.0 | | 75 |

TABLE V

| | A | B | C | D | E | F | G | H | I | J | K | Charge stock |
|---|---|---|---|---|---|---|---|---|---|---|---|---|
| Temperature, °F | 650 | 700 | 725 | 750 | 775 | 750 | 725 | 725 | 700 | 775 | 800 | |
| Pressure, p.s.i.g | 1,000 | 1,000 | 1,000 | 1,000 | 1,000 | 1,000 | 1,000 | 600 | 600 | 1,000 | 1,000 | |
| LHSV | 1.0 | 1.0 | 1.0 | 1.0 | 1.0 | 1.0 | 1.0 | 1.0 | 1.0 | 1.0 | 1.0 | |
| Total LHSV | 1.0 | 1.0 | 1.0 | 1.0 | 1.0 | 1.0 | 1.0 | 1.0 | 1.0 | 1.0 | 1.0 | |
| Gas recycle, s.c.f./b | 0 | 0 | 0 | 0 | 0 | 3,000 | 3,000 | 3,000 | 3,000 | 3,000 | 3,000 | |
| °API | 26.4 | 27.6 | 27.8 | 26.8 | 24.7 | 27.0 | 26.7 | 25.3 | 25.3 | 27.6 | 27.8 | 24.2 |
| Initial | 494 | 434 | 430 | 382 | 278 | 272 | 368 | 432 | 476 | 296 | 268 | 554 |
| 5 | 544 | 500 | 492 | 438 | 352 | 443 | 483 | 510 | 536 | 398 | 334 | 560 |
| 10 | 556 | 522 | 516 | 470 | 436 | 513 | 526 | 539 | 556 | 468 | 503 | 570 |
| 20 | 564 | 548 | 542 | 504 | 506 | 546 | 548 | 561 | 567 | 516 | 480 | 578 |
| 30 | 574 | 562 | 558 | 512 | 533 | 561 | 564 | 572 | 578 | 540 | 515 | 584 |
| 40 | 582 | 572 | 570 | 546 | 562 | 573 | 574 | 581 | 584 | 557 | 536 | 592 |
| 50 | 589 | 582 | 582 | 564 | 577 | 583 | 584 | 590 | 592 | 570 | 554 | 598 |
| 60 | 598 | 592 | 594 | 579 | 598 | 593 | 594 | 600 | 600 | 582 | 574 | 604 |
| 70 | 608 | 606 | 606 | 590 | 608 | 603 | 602 | 610 | 610 | 594 | 586 | 614 |
| 80 | 622 | 620 | 620 | 620 | 626 | 617 | 616 | 623 | 622 | 608 | 600 | 626 |
| 90 | 650 | 644 | 642 | 644 | 648 | 640 | 636 | 642 | 644 | 626 | 627 | 644 |
| 95 | 666 | 668 | 669 | 674 | 685 | 662 | 658 | 664 | 670 | 647 | 644 | 664 |
| EP | 672 | 674 | 679 | 680 | 707 | 677 | 686 | 692 | 678 | 661 | 658 | 668 |
| Rec | 98 | 98 | 98 | 98 | 98 | 98 | 98 | 98 | 98 | 98 | 98 | 98 |
| Volume percent overhead (485° F.) | 4.3 | 7.1 | 10.2 | 14.7 | 17.8 | 7.9 | 7.2 | 3.8 | 4.2 | 15.6 | 24.5 | |

TABLE VI

| | L | M | N | P | Q |
|---|---|---|---|---|---|
| Operating condition: | | | | | |
| Catalyst | NiMo—S | Ni | Ni | | Ni |
| Temperature, °F | 755 | 650 | 675 | | 750 |
| Pressure, p.s.i.g | 500 | 750 | 750 | | 150 |
| LHSV, hr.⁻¹ | 1 | 0.5 | 0.5 | | 0.5 |
| Gas recycle, s.c.f./b | 5,000 | None | None | | None |
| Once-thru H², s.c.f./b | None | 5,000 | 5,000 | | 5,000 |
| 485+product quality: | | | | | |
| S, p.p.m | 1,700 | 61 | <1 | 4 | 4 |
| N, p.p.m | 74 | 6.5 | <1 | <1 | <1 |
| O, p.p.m | 1,560 | 359 | 86 | 102 | 323 |
| Aromatic, wt. percent | 40.2 | 49.9 | 11.7 | 31.2 | 53.7 |
| Mono | 26.3 | 33.2 | 11.3 | 29.0 | 34.4 |
| Di | 12.0 | 13.1 | 0.4 | 2.2 | 15.5 |
| Tri | 1.9 | 3.6 | | | 3.8 |
| UVA at— | | | | | |
| 260 mM | 5.0 | 7.7 | 0.36 | 1.4 | 8.8 |
| 325 mM | 0.38 | 0.42 | 0.016 | 0.069 | 0.46 |
| 335 mM | 0.09 | 0.16 | 0.009 | 0.034 | 0.21 |
| Br. No | | 1.4 | 0.7 | 0.5 | 1.9 |
| M. W | | 243 | 244 | 246 | 236 |
| D 1,500: | | | | | |
| i | 0.75 | 1.25 | 0.50 | 0.25 | 0.75 |
| a | 1.5 | 1.50 | 0.75 | 0.25 | 1.00 |
| (48 hr. UV) | 3.0 | 6.5+ | 1.25 | 1.75 | 2.5 |
| SUS at— | | | | | |
| 100 | 57.2 | 49.2 | 46.4 | 48.7 | 46.0 |
| 210 | 33.9 | 32.6 | 32.3 | 32.6 | 32.0 |
| Flow point, °F | 300 | 275 | 270 | 280 | 285 |
| Gravity | 25.1 | 23.9 | 29.5 | 27.0 | 24.0 |
| Volume percent front end | | 4.9 | 12.5 | 8.8 | 10.8 |
| i | 468 | 425 | 442 | 442 | 441 |
| 5 | 564 | 510 | 511 | 506 | 504 |
| 10 | 570 | 535 | 526 | 538 | 532 |
| 50 | 596 | 604 | 590 | 600 | 596 |
| 90 | 645 | 662 | 646 | 655 | 653 |
| 95 | 666 | 677 | 662 | 670 | 672 |
| EP | 684 | 696 | 676 | 685 | 688 |

TABLE VII

Composition of $C_6^-$ Product Gases from Step 1 of Example I

| Gas: | Lbs./bbl. of feed |
|---|---|
| $H_2$ | 0.26 |
| $H_2O$ | 0.43 |
| $H_2S$ | 0.55 |
| $NH_3$ | 0.03 |
| $CH_4$ | 0.53 |
| $C_2H_6$ | 0.38 |
| $C_3H_8$ | 0.45 |
| $i\text{-}C_4H_{10}$ | 0.03 |
| $i\text{-}C_5H_{12}$ | 0.01 |

The invention claimed is:

1. Process for the manufacture of an aromatic hydrocarbon fluid, useful as a non-discoloring rubber processing oil, comprising (a) contacting a naphthenic distillate feed boiling mainly above 580° F. having a viscosity in the range of 40–10,000 SUS at 100° F. and containing non-hydrocarbon impurities comprising organic heterocyclic sulfur and nitrogen compounds and containing more than 30 percent aromatic hydrocarbons, with a solid sulfided nickel-molybdenum hydrogenation catalyst, said contacting being in the presence of hydrogen and at a temperature, space velocity and pressure such that the resulting refined product contains less than 100 p.p.m. of sulfur and at least 10 percent more aromatic hydrocarbons than is contained in said naphthenic distillate feed, said temperature being below 775° F. and said pressure being maintained below 1500 p.s.i.g., and (b) contacting at least a major portion of said product of step (a) in the presence of hydrogen with a solid hydrogenation-dehydrogenation catalyst comprising at least one metal selected from the group consisting of nickel, platinum, palladium, and rhodium, said contacting being at a temperature below 775° F. and at a space rate and pressure such that the product of such contacting contains less than 10 p.p.m. of sulfur and nitrogen and a greater percent by weight of aromatic compounds than did said portion of said product of step (a) and wherein said product of step (b) contains 50–85 weight percent aromatics and, when topped to the same initial flash point as the product of step (a), has a greater color stability when aged in the presence of ultraviolet light than said product of step (a).

2. Process according to claim 1 wherein prior to said contacting of step (b), said product of step (a) is contacted with an adsorbent comprising an acid-activated clay, a naturally-occurring fuller's earth bleaching clay, charcoal, bauxite, or mixtures thereof.

3. Process according to claim 1 wherein said feed to step (a) boils mainly above 600° F. and has a viscosity in the range of 100–10,000 SUS at 100° F. and wherein the said product of step (a) contains less than 75 p.p.m. of sulfur and less than 10 p.p.m. of nitrogen and than does said feed to step (a) and wherein said feed during the contacting of step (a) is maintained substantially in vapor phase by means of a gaseous recycle greater than 5000 s.c.f./b. and a temperature in the range of 650°–775° F.

4. Process according to claim 3 wherein said temperature pressure and space rate in step (b) are chosen such that said product of step (b) contains at least 3 percent more aromatic hydrocarbons than does said product of step (a).

5. Process according to claim 4 wherein in said step (b) there is a gas recycle of at least 4000 s.c.f./b. which is substantially free of $H_2S$ and wherein the liquid hourly space velocity of said feed to step (b) is from 0.10 to 1.0 volume of feed per volume of catalyst per hour.

6. Process according to claim 5 wherein said naphthenic distillate contains more than 45 percent of aromatic hydrocarbons and has a viscosity greater than 500 SUS at 100° F.

7. Process according to claim 6 wherein said napthenic distillate has a viscosity above 2000 SUS and a 260 UVA greater than 9.0 and wherein the gas recycle in said step (a) is greater than 7000 s.c.f./b.

8. Process according to claim 1 wherein said contacting of step (a) is effected at a pressure below 600 p.s.i.g. and at a temperature and space velocity such that there is a production of hydrogen and wherein said contacting of step (a) is at a pressure at least 20 percent lower than said pressure in step (a) and at a temperature and space velocity such that methane is produced.

9. Process according to claim 8 wherein said metal of the catalyst in step (b) comprises nickel.

10. Process for the manufacture of an aromatic hydrocarbon fluid, useful as a non-discoloring rubber processing oil, comprising
(a) catalytic contacting of a naphthenic distillate in the lubricating oil boiling range, which has a viscosity in the range of 30–20,000 SUS at 100° F., contains non-hydrocarbon impurities comprising organic heterocyclic sulfur and nitrogen compounds and contains naphthene hydrocarbons which are capable of being converted to aromatic hydrocarbon, said contacting being with a solid sulfactive hydrogenation-dehydrogenation catalyst in the presence of hydrogen and at a temperature space velocity and pressure such that less than 14 volume percent of said naphthenic distillate is converted to materials boiling below 485° F., whereby the resulting refined product contains less than 100 p.p.m. of sulfur and at least 10 percent more aromatic hydrocarbons than is contained in said napthenic distillate, said temperature being below 775° F. and said pressure being maintained below 1500 p.s.i.g., and
(b) contacting at least a major portion of said product of step (a) in the presence of hydrogen with a solid hydrogenation-dehydrogenation catalyst comprising at least one metal selected from the group consisting of nickel, platinum, palladium, rhenium and rhodium, said contacting being at a temperature below 775° F. and at a space rate and pressure such that the product of such contacting contains a greater percent by weight of aromatic compounds than did said portion of said product of step (a) and wherein said product of step (b) contains 50–85 weight percent aromatics and, when topped to the same initial flash point as the product of step (a), has a greater color stability when aged in the presence of ultraviolet light than said product of step (a).

11. Process according to claim 10 wherein the product of said step (b), when topped to remove materials boiling below 485° F., is a hydrocarbon oil, useful for rubber processing, having a viscosity-gravity constant above 0.83, a viscosity at 100° F. in the range of 40–10,000 SUS, an ultra-violet absorbency at 260 millimicrons greater than 8.0, boiling mainly above 540° F. and containing 50 and 85 percent of aromatic hydrocarbons, said oil having an initial ASTM D1500 color lighter than 1.5 and an ASTM D1500 color less than 3.0 when aged for 48 hours in the presence of ultraviolet light under test procedure A of this application.

12. Process according to claim 1 wherein said naphthenic distillate has been obtained by vacuum distillation of a naphthenic crude wherein a distillate fraction having a viscosity in the range of 1500–3000 SUS at 100° F. has a viscosity gravity constant in the range from 0.84 to 0.92.

References Cited
UNITED STATES PATENTS

| | | | |
|---|---|---|---|
| 2,334,582 | 11/1943 | Read | 260—33.6 AQ |
| 2,415,541 | 2/1947 | Soday | 260—668 |
| 2,778,808 | 1/1957 | Dunkel et al. | 208—14 |
| 2,911,354 | 11/1959 | Holder et al. | 208—14 |
| 3,178,357 | 4/1965 | Black et al. | 208—14 |
| 3,406,111 | 10/1968 | Wynkoop et al. | 208—14 |
| 3,434,994 | 3/1969 | Smit | 260—33.6 AQ |
| 3,462,358 | 8/1969 | Mills et al. | 208—14 |
| 3,530,061 | 9/1970 | Orkin et al. | 208—141 |

HERBERT LEVINE, Primary Examiner

U.S. Cl. X.R.
208—14, 65, 141; 260—33.6 AQ; 208—DIG 2